United States Patent
Marian

(10) Patent No.: US 7,216,020 B2
(45) Date of Patent: May 8, 2007

(54) METHOD AND SYSTEM FOR CONTROLLING AN IRRIGATION SCHEDULING ENGINE USING COMPUTED EVAPOTRANSPIRATION VALUES

(75) Inventor: Michael Marian, Penngrove, CA (US)

(73) Assignee: Hydropoint Data Systems, Inc., Petaluma, CA (US)

( * ) Notice: Subject to any disclaimer, the term of this patent is extended or adjusted under 35 U.S.C. 154(b) by 0 days.

(21) Appl. No.: 10/977,130

(22) Filed: Oct. 29, 2004

(65) Prior Publication Data

US 2005/0187666 A1    Aug. 25, 2005

Related U.S. Application Data

(60) Provisional application No. 60/515,905, filed on Oct. 29, 2003, provisional application No. 60/515,932, filed on Oct. 29, 2003, provisional application No. 60/515,628, filed on Oct. 29, 2003.

(51) Int. Cl.
| | |
|---|---|
| G05D 7/00 | (2006.01) |
| G05D 11/00 | (2006.01) |
| G01W 1/00 | (2006.01) |
| G01V 1/00 | (2006.01) |
| F16K 17/36 | (2006.01) |
| F16F 31/00 | (2006.01) |
| G05B 11/00 | (2006.01) |

(52) U.S. Cl. ............ 700/284; 700/282; 700/283; 702/3; 702/16; 73/170.16; 137/78.2; 137/78.3

(58) Field of Classification Search ............ 700/17–20, 700/282–284; 702/3, 16; 73/170.16; 137/78.2, 137/78.3
See application file for complete search history.

(56) References Cited

U.S. PATENT DOCUMENTS

| | | | | | |
|---|---|---|---|---|---|
| 5,379,215 | A | * | 1/1995 | Kruhoeffer et al. | 702/3 |
| 5,479,339 | A | * | 12/1995 | Miller | 700/16 |
| 5,675,081 | A | * | 10/1997 | Solheim et al. | 73/170.28 |
| 5,696,671 | A | * | 12/1997 | Oliver | 700/284 |
| 5,740,038 | A | * | 4/1998 | Hergert | 700/284 |
| 5,870,302 | A | * | 2/1999 | Oliver | 700/11 |
| 6,052,648 | A | * | 4/2000 | Burfeind et al. | 702/3 |
| 6,714,134 | B2 | * | 3/2004 | Addink et al. | 340/601 |
| 7,043,368 | B1 | * | 5/2006 | Cote et al. | 702/3 |
| 7,133,749 | B2 | * | 11/2006 | Goldberg et al. | 700/284 |
| 2004/0215394 | A1 | * | 10/2004 | Carpenter et al. | 702/3 |

OTHER PUBLICATIONS

Michalakes, J., "Design of a Next-Generation Regional Weather Research and Forecast Model," Preprint ANL/MCS-P735-1198, entire document, Nov. 1998.

* cited by examiner

*Primary Examiner*—Leo Picard
*Assistant Examiner*—R D Hartman, Jr.
(74) *Attorney, Agent, or Firm*—McDermott Will & Emery LLP

(57) ABSTRACT

A system for providing irrigation control is provided. The system includes a number of non-local data sources for providing data, a processor and an irrigation system. The processor is configured to receive data from one or more of the non-local data sources and calculate an evapotranspiration (ET) value for an irrigation area that is non-local with respect to the non-local data sources. The processor is further configured to create or alter an irrigation program based on the ET value. The irrigation system is configured to receive the irrigation program from the processor and provide appropriate irrigation control for the irrigation area using the irrigation program.

20 Claims, 2 Drawing Sheets

METHOD AND SYSTEM FOR
CONTROLLING AN IRRIGATION
SCHEDULING ENGINE USING COMPUTED
EVAPOTRANSPIRATION VALUES

CROSS-REFERENCES TO RELATED
APPLICATION(S)

The present application claims the benefit of priority under 35 U.S.C. §119 from (1) U.S. Provisional Patent Application Ser. No. 60/515,905, entitled "METHOD FOR PROVIDING OFFSET TO COMPUTED EVAPOTRANSPIRATION VALUES", filed on Oct. 29, 2003, (2) U.S. Provisional Patent Application Ser. No. 60/515,932, entitled "METHOD FOR CONTROLLING IRRIGATION USING COMPUTED EVAPOTRANSPIRATION VALUES", filed on Oct. 29, 2003, and (3) U.S. Provisional Patent Application Ser. No. 60/515,628, entitled "METHOD FOR CONTROLLING AN IRRIGATION SCHEDULING ENGINE USING COMPUTED EVAPOTRANSPIRATION VALUES", filed on Oct. 29, 2003, the disclosures of which are hereby incorporated by reference in their entirety for all purposes.

BACKGROUND OF THE INVENTION

The present invention generally relates to irrigation control and, more specifically, to methods and systems for controlling an irrigation scheduling engine using computed evapotranspiration (ET) values in a remote manner.

Typically, irrigation control information is manually input by an user to an irrigation system in order to allow the irrigation system to provide an appropriate amount of irrigation. Such irrigation control information is generally based on measurements obtained by the user from other equipment and/or data collected by a weather station. The irrigation system, in turn, provides an appropriate amount of irrigation based on the input information.

The foregoing irrigation arrangement has a number of shortcomings. For example, the user has to first obtain the requisite irrigation control information and then manually input such information into the irrigation system. Furthermore, such information does not necessarily accurately reflect the local weather conditions that are applicable to the areas covered by the irrigation system. This is because the irrigation control information may be generated based on data collected by a distant or non-local weather station that is located some distance away from the areas covered by the irrigation system. The weather station may be located in an area where the weather conditions vary quite significantly from those of the areas covered by the irrigation system. As a result, the irrigation control information (which is based on data collected from the distant weather station) may cause the irrigation system to provide irrigation that is substantially different from what is required for the areas covered by the irrigation system.

Hence, it would be desirable to provide a system that is capable of providing accurate irrigation control information using non-local data sources.

SUMMARY OF THE INVENTION

In one embodiment, a system for providing irrigation control is provided. The system includes a number of non-local data sources for providing data, a processor configured to receive data from one or more of the plurality of non-local data sources and calculate an evapotranspiration (ET) value for an irrigation area that is non-local with respect to the non-local data sources, the processor further configured to create or alter an irrigation program based on the ET value, and an irrigation system configured to receive the irrigation program from the processor and provide appropriate irrigation control for the irrigation area using the irrigation program.

In another embodiment, a system for providing irrigation control includes a number of non-local data sources for providing data, a processor configured to receive data from one or more of the non-local data sources and calculate an evapotranspiration (ET) value for an irrigation area that is non-local with respect to the plurality of non-local data sources, the processor further configured to create one or more components constituting an irrigation program based on the ET value, and an irrigation system configured to receive the one or more components from the processor.

In yet another embodiment, a system for providing irrigation control includes a number of non-local data sources for providing data, a processor configured to receive data from one or more of the non-local data sources and calculate weather parameters using a modeling application, the processor also configured to use the weather parameters to compute an evapotranspiration (ET) value for an irrigation area that is non-local with respect to the plurality of non-local data sources, the processor further configured to create or alter an irrigation program based on the ET value, and an irrigation system configured to receive the irrigation program from the processor and provide appropriate irrigation control for the irrigation area using the irrigation program.

In a further embodiment, a system for providing irrigation control includes a number of non-local data sources for providing data, a processor configured to receive data from one or more of the non-local data sources and calculate an evapotranspiration (ET) value for an irrigation area that is non-local with respect to the plurality of non-local data sources, and an irrigation system configured to receive the ET value from the processor, create or alter an irrigation program based on the ET value and provide appropriate irrigation control for the irrigation area using the irrigation program.

In one aspect of the present invention, a method for providing irrigation control includes: receiving data from one or more non-local data sources, calculating an evapotranspiration (ET) value based on the data received from the one or more non-local data sources, wherein the ET value is for an irrigation area that is non-local with respect to the non-local data sources, creating or altering an irrigation program based on the ET value, and providing appropriate irrigation control for the irrigation area based on the irrigation program.

In another aspect of the present invention, a method for providing irrigation control includes: receiving data from one or more non-local data sources, calculating an evapotranspiration (ET) value based on the data received from the one or more non-local data sources, wherein the ET value is for an irrigation area that is non-local with respect to the non-local data sources, generating one or more components constituting an irrigation program based on the ET value, and transmitting the one or more components to an irrigation system.

In yet another aspect of the present invention, a method for providing irrigation control includes: receiving data from one or more non-local data sources, calculating weather parameters using a modeling application based on the data received from the one or more non-local data sources, using the weather parameters to compute an evapotranspiration (ET) value for an irrigation area that is non-local with respect to the non-local data sources, creating or altering an irrigation program based on the ET value, and transmitting the irrigation program to an irrigation system.

In a further aspect of the present invention, a method for providing irrigation control includes: receiving data from one or more non-local data sources, calculating an evapotranspiration (ET) value based on the data received from the one or more non-local data sources, wherein the ET value is for an irrigation area that is non-local with respect to the one or more non-local data sources, transmitting the ET value to an irrigation system, directing the irrigation system to create or alter an irrigation program based on the ET value, and directing the irrigation system to provide appropriate irrigation control for the irrigation area using the irrigation program.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

Aspects, advantages and novel features of the present invention will become apparent from the following description of the invention presented in conjunction with the accompanying drawings.

DETAILED DESCRIPTION OF THE INVENTION

Figure 1:
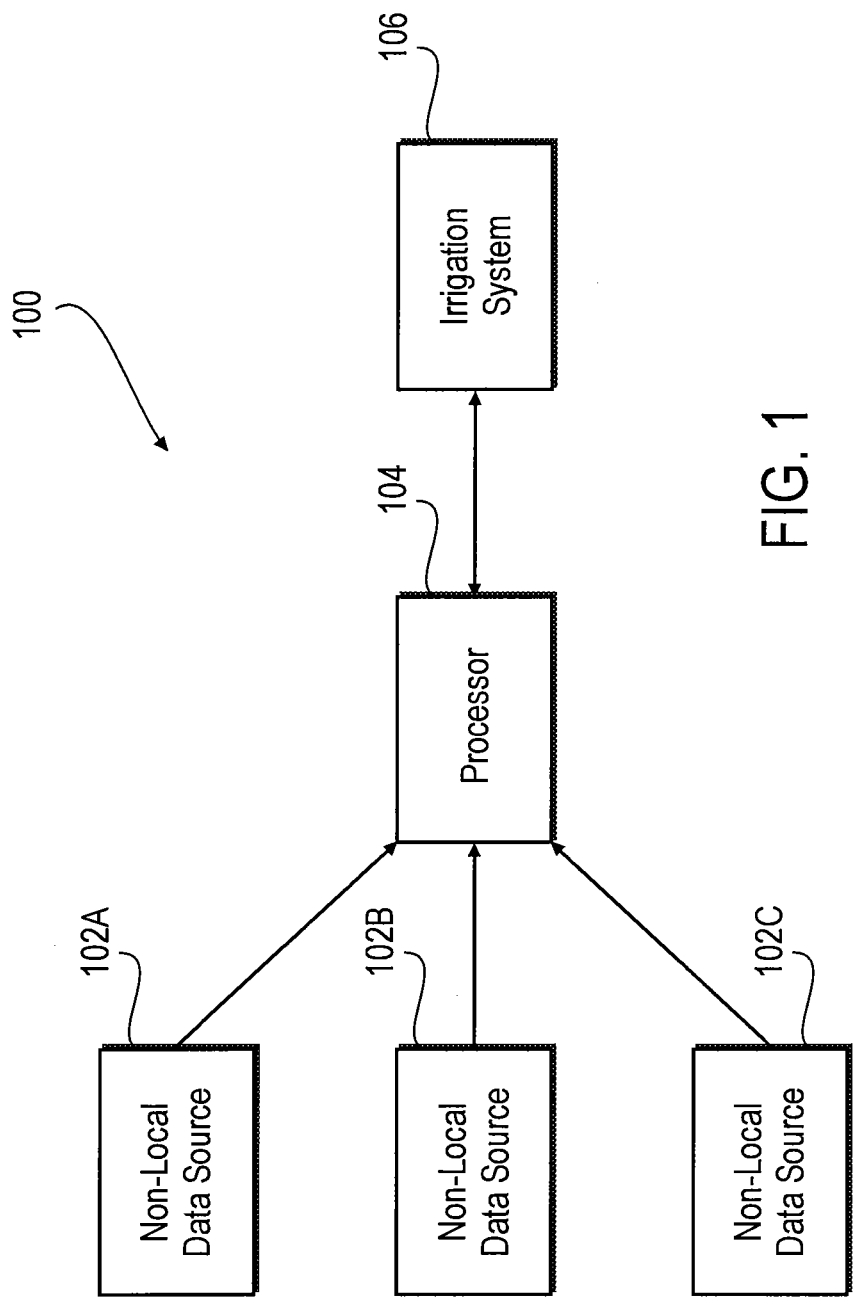
FIG. 1 is a simplified schematic block diagram illustrating one embodiment of the present invention.

The present invention in the form of one or more embodiments will now be described. As shown in FIG. 1, one embodiment of the present invention is a system 100 that includes a number of non-local data sources 102a–c, a processor 104 and an irrigation system 106. The processor 104 is configured to receive data from one or more of the non-local data sources 102a–c, use such data to compute an ET value and then transfer the computed ET value to the irrigation system 106. The irrigation system 106 is configured to receive the computed ET value from the processor 104 and provide irrigation or perform other irrigation functions accordingly.

Each data source 102 provides information that can be utilized to generate irrigation control information including, for example, an ET value. The ET value is calculated based on a number of parameters including, for example, relative humidity, soil temperature, air temperature, wind speed and solar radiation. The number of parameters may vary depending on the methodology that is used to calculate the ET value. The data sources 102a–c collectively provide information on these parameters. Each data source 102 may provide information corresponding to one or more parameters. The information is then used to compute the ET value, as will be further described below. Data from the non-local data sources 102a–c is used because the area in which the irrigation system 106 is located does not have sufficient measuring apparatus or resources to obtain local information that is needed to determine the ET value in that area.

The data sources 102a–c are non-local in the sense that they are not located in the same general area as the irrigation system 106. For example, one data source is the National Weather Service which provides general weather information across the United States; other data sources include databases or data feeds from various universities and government agencies. It should be understood that the meaning of the term "non-local" is not strictly defined by physical distance; "non-local" may also refer to an area that is subject to generally different weather conditions. For example, two areas may be physically close to one another; however, they may be non-local with respect to each other because they have generally different weather conditions attributed to different geographical topologies and different topographies. As mentioned before, the data sources 102a–c collectively provide data that relate to the various parameters that are used to compute the ET value for the area(s) covered by the irrigation system 106. For example, data collected from the data sources 102a–c include surface observations, upper air observations, sea surface temperatures and current global initialization 4D (4-dimensional) grids, etc.

Data from the data sources 102a–c are transmitted to the processor 104. It should be noted that data from the data sources 102a–c can be transmitted to the processor 104 in a number of ways including, for example, via a computer network such as the Internet. Based on the disclosure and teachings provided herein, a person of ordinary skill in the art will know of other ways and/or methods to transmit the data from the data sources 102a–c to the processor 104 in accordance with the present invention.

The processor 104, in turn, processes the data to calculate the desired ET value for each particular area covered by the irrigation system 106. First, the processor 104 calculates the requisite weather parameters in 4D space.

The weather parameters in 4D space are calculated as follows. The gridded terrain elevation, vegetation and land use are horizontally interpolated onto each mesoscale domain. Input fields such as soil types, vegetation fraction, and deep soil temperature, are populated from historical data.

Then, the 4D gridded meteorological analyses on pressure levels are input and those analyses are interpolated from global grids to each mesoscale domain. The foregoing steps perform the pressure-level and surface analyses. Two-dimensional interpolation is performed on these levels to ensure a completely populated grid.

Next, the global initialization on each mesoscale grid is adjusted by incorporating observation data from the data sources 102a–c. Different types of observation data are used including, for example, traditional direct observations of temperature, humidity, wind from surface and upper air data as well as remote sensed data, such as, radar and satellite imagery. The three-dimensional and four-dimensional variational techniques both integrate and perform quality control on the data, eliminating questionable data to improve the global initialization grids.

The initial boundary conditions are then calculated and formatted for input to a numerical weather model. It will be appreciated that a number of different numerical weather models can be used depending on each particular application. Based on the disclosure and teachings provided herein, a person of ordinary skill in the art will know how to select the appropriate numerical weather model in accordance with the present invention. For example, one process converts pressure level data to an "S" coordinate system under bounded conditions in 4D space (x, y, z and time). The integrated mean divergence or noise conditions that the initial analyses may contain are then removed to create a stable base state for the numerical weather model.

Using the numerical weather model, and the appropriate physics options, the requisite weather parameters in 4D space are then calculated. This is a fully bounded 4D grid in both space and time with known starting and ending conditions.

Calculation of the weather parameters can be performed by the processor 104 using a number of modeling applications (not shown) that are publicly available. These modeling applications can be modified to perform the functions as described above. One such modeling application is known as the PSU/NCAR mesoscale model (known as MM5). The MM5 is a limited-area, nonhydrostatic, terrain-following sigma-coordinate model designed to simulate or predict mesoscale atmospheric circulation. Another such modeling application is the WRF (Weather Research and Forecasting) model created by UCAR (University Corporation for Atmospheric Research). Based on the disclosure and teachings provided herein, a person of ordinary skill in the art will know how to select and modify the various available modeling applications for use in accordance with the present invention.

The calculated weather parameters outputted from the numerical weather model are then used to calculate the ET value for a target location in 2D space. Corresponding weather parameters needed for calculating the ET value for the target location are extracted at specific x, y, z & time locations.

The ET value at the target location is then calculated and a 2D gridded surface for the 24 hour period is created. It should be understood that the ET value may be calculated based on one of a number of different formulas. Based on the disclosure and teachings provided herein, a person of ordinary skill in the art will appreciate how to select the appropriate formula depending on each particular situation.

Finally, any artifacts, edge effects and anomalies created by mesoscale grid boundaries conditions and/or errors are eliminated.

The processor 104 then transfers the computed ET value to the irrigation system 106. Upon receiving the computed ET value, the irrigation system 106 can then provide the proper irrigation or perform other irrigation functions in an automated manner.

The processor 104 is typically located at some distance away from the irrigation system 106. The transfer of the computed ET value from the processor 104 to the irrigation system 106 can be done in a number of ways. For example, the computed ET value can be transmitted to the irrigation system 106 via wired or wireless communications. Based on the disclosure and teachings provided herein, a person of ordinary skill in the art will know of other ways and/or methods to transfer the computed ET value from the processor 104 to the irrigation system 106.

Furthermore, in one embodiment, the processor 104 first encrypts or mathematically alters the computed ET value before transferring it to the irrigation system 106. The irrigation system 106 is equipped with the corresponding decryption algorithm to decrypt or restore the computed ET value.

In an alternative embodiment, after the processor 104 derives the weather parameters, such weather parameters are transferred to the irrigation system 106. Using the transferred weather parameters, the irrigation system 106 then computes the appropriate ET value. Optionally, the processor 104 can encrypt the weather parameters before transferring them to the irrigation system 106 and the irrigation system 106 is equipped with the corresponding decryption algorithm to decrypt or restore such data.

Figure 2:
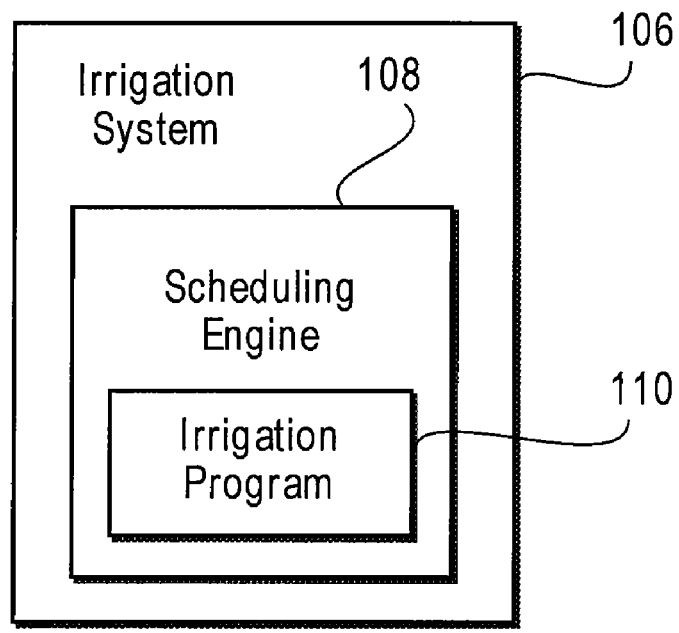
FIG. 2 is a simplified schematic block diagram illustrating one embodiment of an irrigation system according to the present invention.

In one embodiment, as shown in FIG. 2, the irrigation system 106 further includes a scheduling engine 108. The scheduling engine 108 further includes an irrigation program 110 that is designed to control various components of the irrigation system 106 to automatically provide proper irrigation or perform other irrigation functions. The scheduling engine 108 may use the received or derived computed ET value to either create one or more new irrigation programs or, alternatively, alter one or more existing irrigation programs.

In an alternative embodiment, after the processor 104 computes the ET value as described above, the processor 104 uses the computed ET value to create or alter an irrigation program 110 suitable for the irrigation system 106. The irrigation program 110 is then transferred or uploaded to the irrigation system 106. Subsequently, the scheduling engine 108 uses the irrigation program 110 to provide the proper irrigation or perform other irrigation functions.

Alternatively, the processor 104 uses the computed ET value to create information that can be used by the scheduling engine 108 to update or alter the irrigation program 110. Such information is then forwarded by the processor 104 to the scheduling engine 108 so as to allow the scheduling engine 108 to update or alter the irrigation program 110.

In another alternative embodiment, after the irrigation program 110 is created or altered, the processor 104 breaks down the irrigation program 110 into one or more component values. Such component values are then transferred from the processor 104 to the scheduling engine 108. The scheduling engine 108 uses such component values to derive or re-constitute the irrigation program 110. The irrigation program 110 is then used by the scheduling engine 108 to provide the proper irrigation or perform other irrigation functions. The component values of the irrigation program 110 may be individually transmitted to the scheduling engine 108 at different times.

Optionally, the irrigation program 110 or component values thereof are mathematically altered or encrypted before they are transferred to the irrigation system 106 by the processor 104. The irrigation system 106 is equipped with the corresponding decryption algorithm to decrypt or restore the irrigation program 110 or component values thereof.

In one embodiment, the irrigation program 110 has a number of discrete states respectively representing various stages of irrigation to be provided by the irrigation system 106. The processor 104 executes the irrigation program 110 and, upon arriving at a particular discrete state, the processor 104 transfers information relating to that particular discrete state to the scheduling engine 108. The scheduling engine 108, in response, provides the proper irrigation or performs other irrigation functions.

Optionally, the information relating to the discrete states can be mathematically altered or encrypted before it is transferred to the scheduling engine 108. The scheduling engine 108 is equipped with the corresponding decryption algorithm to decrypt or restore such information.

In addition, in some situations, the ET value is computed based on erroneous information. In one embodiment, the processor 104 is configured to re-calculate a new, correct ET value using the latest, accurate information. Moreover, using the new ET value and the old ET value, the processor 104 is further configured to calculate an offset. The offset is similar to a delta function that represents a correction to the old ET value. The processor 104 then transfers the offset to the irrigation system 106. The irrigation system 106, in turn, updates the old ET value with the offset and provides the appropriate irrigation or performs other irrigation functions via, for example, the scheduling engine 108 and/or the irrigation program 110. Since the old ET value is taken into consideration when the offset is calculated, past erroneous irrigation is corrected by the irrigation system 106 when the offset is used by the scheduling engine 108 and/or irrigation program 110 to provide the proper irrigation.

Optionally, the offset can be mathematically altered or encrypted before it is transferred to the irrigation system 106.

In an alternative embodiment described above where the processor 104 creates or alters an irrigation program 110 based on the computed ET value, the processor 104 can further utilize the offset to create a new irrigation program or alter an existing irrigation program. The new or altered irrigation program can then be forwarded to the irrigation system 106.

In an exemplary implementation, the present invention is implemented using software in the form of control logic, in either an integrated or a modular manner. The control logic may reside on a computer-readable medium executable by the processor 104 or a computer. Alternatively, hardware or a combination of software and hardware can also be used to implement the present invention. Based on the disclosure and teachings provided herein, a person of ordinary skill in the art will know of other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. An irrigation control system comprising:
   a plurality of data sources for collecting weather data at a plurality of areas;
   a processor receiving the weather data;
   the processor calculating a completely populated 4-D grid of weather parameters from the weather data, the 4-D grid comprising x, y, z and time locations;
   the processor calculating an ET value at a target location by extracting x, y, z and time locations from the 4-D grid of the weather parameters, the processor further configured to create or alter an irrigation program based on the ET value; and
   an irrigation system receiving the irrigation program from the processor, wherein the irrigation system provides irrigation control based on the irrigation program.

2. The irrigation control system of claim 1, wherein the plurality of areas are all located outside of an irrigation region in which the irrigation control is being provided, and the target location is located within the irrigation region.

3. The irrigation control system of claim 1, wherein the 4-D grid of the weather parameters are calculated using a numerical weather model.

4. The irrigation control system of claim 1, wherein the 4-D grid is fully bounded in space and time with known starting and ending conditions.

5. The irrigation control system of claim 1, wherein the 4-D grid of weather parameters are calculated using a modified modeling program.

6. An irrigation control system comprising:
   a processor retrieving the weather data from a plurality of data sources that collect weather data at a plurality of areas;
   the processor calculating a completely populated 4-D grid of weather parameters from the weather data;
   the processor calculating an ET value at a target location by extracting x, y, z and time locations from the 4-D grid of the weather parameters, the processor further configured to create or alter an irrigation program based on the ET value; and
   the processor providing the irrigation program to an irrigation system located at the target location, thereby allowing the irrigation system to provide irrigation control based on the received irrigation program.

7. The irrigation control system of claim 6, wherein the plurality of areas are all located outside of an irrigation region in which the irrigation control is being provided, and the target location is located within the irrigation region.

8. The irrigation control system of claim 6, wherein the 4-D grid of the weather parameters are calculated using a numerical weather model.

9. The irrigation control system of claim 6, wherein the 4-D grid is fully bounded in space and time with known starting and ending conditions.

10. The irrigation control system of claim 6, wherein the 4-D grid of weather parameters are calculated using a modified modeling program.

11. A method of providing irrigation control comprising:
    collecting weather data from a plurality areas;
    calculating a completely populated 4-D grid of weather parameters from the weather data;
    calculating an ET value at a target location by extracting x, y, z and time locations from the 4-D grid of the weather parameters;
    creating or altering an irrigation program based on the ET value; and
    controlling irrigation at the target area based on the irrigation program.

12. The method of claim 11, wherein the plurality of areas are all located outside of an irrigation region in which the irrigation control is being provided, and the target location is located within the irrigation region.

13. The method of claim 11, wherein the 4-D grid of the weather parameters are calculated using a numerical weather model.

14. The irrigation method of claim 11, wherein the 4-D grid is fully bounded in space and time with known starting and ending conditions.

15. The method of claim 11, wherein the 4-D grid of weather parameters are calculated using a modified modeling program.

16. A method of providing irrigation control comprising:
    retrieving weather data from a plurality areas;
    calculating a completely populated 4-D grid of weather parameters from the weather data;
    calculating an ET value at a target location by extracting x, y, z and time locations from the 4-D grid of the weather parameters;
    creating or altering an irrigation program based on the ET value; and
    controlling irrigation at the target area based on the irrigation program.

17. The method of claim 16, wherein the plurality of areas are all located outside of an irrigation region in which the irrigation control is being provided, and the target location is located within the irrigation region.

18. The method of claim 16, wherein the 4-D grid of the weather parameters are calculated using a numerical weather model.

19. The irrigation method of claim 16, wherein the 4-D grid is fully bounded in space and time with known starting and ending conditions.

20. The method of claim 16, wherein the 4-D grid of weather parameters are calculated using a modified modeling program.

* * * * *